Nov. 21, 1967     A. MAMO     3,353,694
BOAT RELEASE MEANS FOR BOAT TRAILER
Filed Dec. 23, 1965
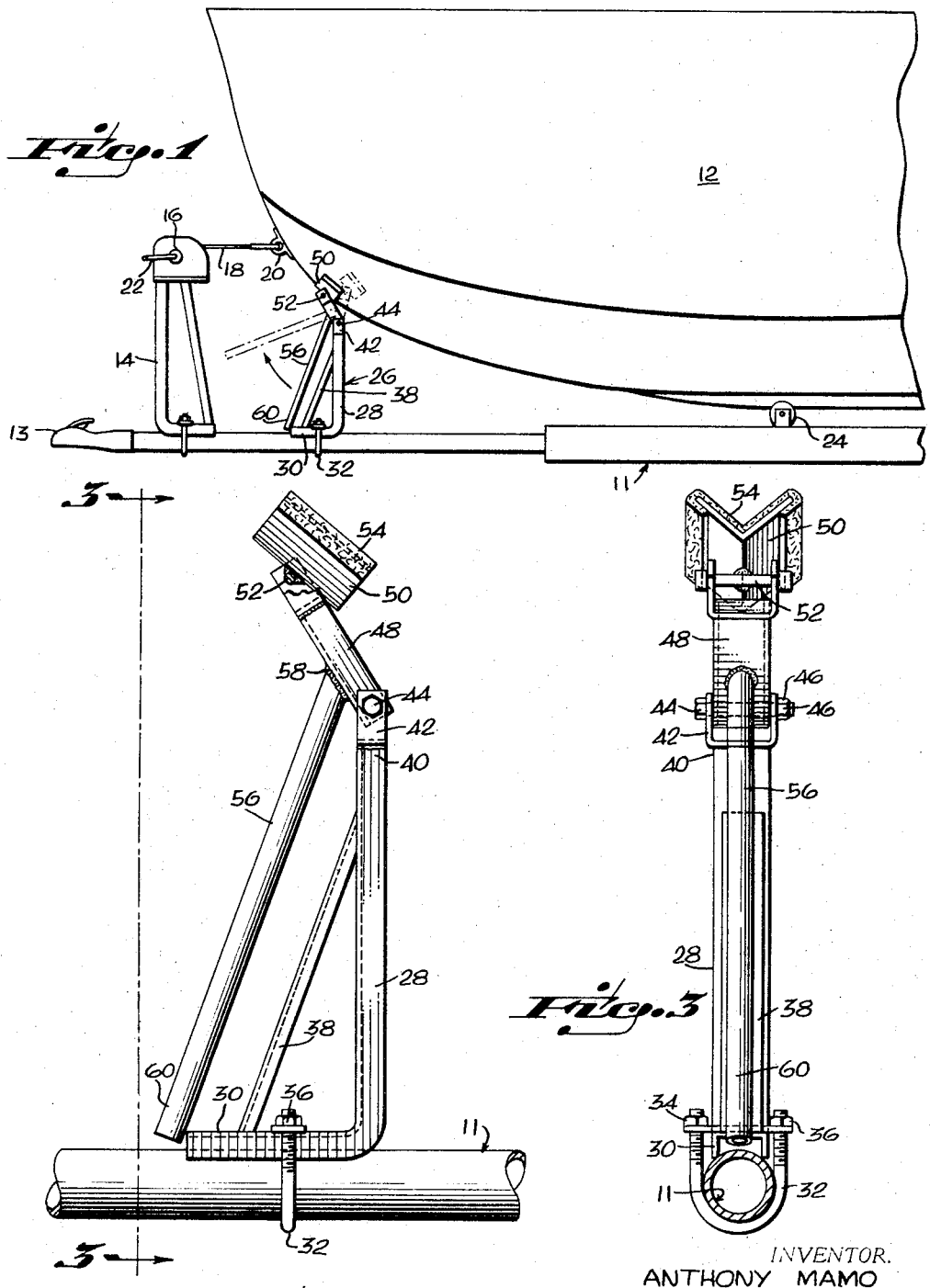
INVENTOR.
ANTHONY MAMO
BY John Cyril Malloy
ATTORNEY.

United States Patent Office 3,353,694
Patented Nov. 21, 1967

3,353,694
BOAT RELEASE MEANS FOR BOAT TRAILER
Anthony Mamo, 895 W. 19th St.,
Hialeah, Fla. 33010
Filed Dec. 23, 1965, Ser. No. 517,187
7 Claims. (Cl. 214—82)

ABSTRACT OF THE DISCLOSURE

A boat trailer release means detachably mounted between a trailer winch and the general bed of the trailer for initiating removal of the boat separate and distinct from the winch, in which the boat release means include a support detachably mounted on the trailer tongue having a lever arm pivoted to the support and in which the lever arm includes a manually engageable lever for pivoting the arm and further includes a cradle engageable with the bow of a boat generally along the keel line.

---

This invention relates to a boat release means for initiating removal of a boat from the boat supporting bed of a boat trailer and, more particularly, to a pivotally mounted cradle for applying initial pressure by means of an interconnected lever arm to a boat to be removed from a boat supporting bed of a boat trailer.

As is perhaps well known, the sport of boating has increased in popularity within the past few years and it is quite common for sportsmen to move their own boat equipment on a boat trailer to a suitable site for launching. Quite often the boat trailers include chocks or other supporting members for the hull of the boat to cushion it as it is traveled down a road, the said chocks or members defining a boat support bed. One disadvantage of the chocks, which are customarily covered by a rug pad or the like, is that they tend to stick or adhere to the surface of the hull of the boat so that when removing the boat from the trailer it is quite a difficult job to initially break the boat away from the members defining the support bed of the trailer. The instant invention provides a pivotally supported lever arm with a cradle which is adapted to embrace the forward end of the boat centrally thereof to be utilized to apply pressure to initially move the boat slightly so as to overcome the adherence of the chocks to the boat so that it may be moved from the trailer in the conventional manner.

It is, accordingly, an object of this invention to provide a boat release means to be mounted on a boat trailer to initially move the boat slightly with respect to the trailer so that it may then be moved in the ordinary course from the trailer.

It is another object of this invention to provide a boat release means for mounting on a boat trailer which includes a standard to be mounted to the trailer and to pivotally support an arm and an operator lever therefor which arm has mounted to the distal end thereof a cradle to engage and embrace the forward end or bow of a boat carried by the trailer.

It is another object of this invention to provide a boat release means for a boat trailer of the type described hereinafter which is relatively simple in construction, inexpensive to manufacture, and otherwise well adapted for the purposes for which the same is intended.

In accordance with these and other objects which will become apparent hereinafter, the instant invention will now be described with reference to the accompanying drawings;

FIGURE 1 is a partial side elevation view illustrating a boat mounted or supported on a boat trailer which boat trailer is equipped with boat release means of the type described hereinafter;

FIGURE 2 is a side elevation view of the boat release means which is enlarged for purposes of illustration; and FIGURE 3 is a view taken along the plane of the line indicated by the arrowed line 3—3 of FIGURE 2.

With reference to the attached drawings wherein like reference characters designate like or corresponding parts throughout the different views, and referring particularly to FIGURE 1, the numeral 11 generally designates a boat trailer having a boat 12 supported thereon. As is well known in the art, a hitch 13 is provided for the forward end of the trailer for attachment of it to a vehicle. Additionally, as is well known in the art, a support structure 14 for the cable reel 16 is provided for connecting a cable 18 at one end to an eye on the bow of a boat, as at 20, with the other end passing over the reel to adapt it for winding by the handle 22 or such other means as may be used to turn the reel and to pull the boat up onto the trailer. Intermediate the length of the boat there are various supports, which are not shown, which outline and define a boat supporting surface or floor to cradle the sides of the boat. Additionally, the keel of the boat is usually supported on rollers such as that indicated by the numeral 24. The present boat release means which is generally designated by the arrowed line 26 and shown clearly in FIGURES 2 and 3, comprises a standard 28 which is provided with an angled floor portioned 30 and supported so that it extends upwardly from the main plane of the boat trailer to cradle the bow of a boat being moved in a supporting position on the trailer boat supporting surface. It will be noted that clamp means 32, comprising a U-bolt in the preferred embodiment and retaining nuts 34 and 36, are provided to attach the standard 28 to the trailer and that a support brace 38 is provided to lend additional support. To the distal end 40 of the standard in a suitable clevis arrangement, such as 42, there is pivotally mounted as by the headed pivot pin 44, provided with the nut 46, a rigid arm 48. The arm 48 is provided with a pivotally mounted cradle 50 at the distal end thereof on a suitable pivot pin 52 which in turn is also provided with suitable means to hold it in position with respect to the arm. The cradle is provided with an overlaying pad 54 to cushion the floor of the cradle. As can be seen clearly in FIGURE 2 an operator lever arm 56 is provided, the said lever arm being connected intermediate the rigid arm of 48 as by welding 58.

In use, it will be apparent that one may, by applying force to the lower end 60 of the operator arm, cause the rigid arm 48 to pivot with respect to the pivot pin 44 with the result that the cradle will be moved upwardly and rearwardly applying pressure through the floor of the cradle to the bow of the boat causing it to move slightly to the rear. The pressure is maintained until the boat is broken slightly away from its support so that the forces causing the adherence of the boat and the chocks will be broken initially. Thereafter, the boat is removed from the trailer in the conventional manner.

While the instant invention has been shown and described herein in what is conceived to be the most practical and preferred embodiment, it is recognized that departures may be made therefrom within the scope of the invention, which is therefore not to be limited to the details disclosed herein but it to be accorded the full scope of the claims so as to embrace any and all equivalent apparatus and articles.

What is claimed is:

1. In a boat trailer including boat support means rearwardly of hitch means, winch means at the forward end of said trailer for drawing a boat onto the boat support means and controlling the removal of the boat therefrom; the improvement comprising: release means mounted on said trailer between said winch and boat support means and separate and distinct therefrom, said release means comprising a standard including a generally vertically extending portion, a lever arm pivotally mounted on said standard, a manually-operable lever secured to said lever arm, and a cradle mounted on said lever arm for engaging the bow portion of a boat along the keel line whereby the boat is stabilized during transit and initial dislodgement is initiated by said boat release means independently of said winch means.

2. The structure as claimed in claim 1 in which said cradle is pivotally mounted on said lever arm for permitting said cradle to generally adapt to the contour of a boat keel.

3. The structure as claimed in claim 1 in which said cradle comprises a cushioned surface having a generally V-shaped configuration.

4. The structure as claimed in claim 1 including means for detachably connecting said standard onto said boat trailer.

5. The structure as claimed in claim 4 in which said standard includes a rigid substantially L-shaped member having a lower portion engaged by said means for detachable connection, an upper portion of said support including a terminal clevis, a pivot pin extending transversely of said clevis and upon which said lever arm is pivoted.

6. The structure as claimed in claim 5 in which said lever arm includes a transverse pivot pin, said cradle being pivotally mounted on said last mentioned pivot pin.

7. The structure as claimed in claim 5 in which said lower standard portion comprises a channel member for embracing a portion of the boat trailer, said means for detachable connection comprising a U-shaped slidable bolt and nut assembly.

References Cited
UNITED STATES PATENTS

| | | | |
|---|---|---|---|
| 3,038,617 | 6/1962 | Seegrist | 214—506 XR |
| 3,069,038 | 12/1962 | Ahlbin | 214—505 |
| 3,112,042 | 11/1963 | Leshner | 214—511 |
| 3,069,038 | 12/1962 | Ahlbin | 214—505 |

ROBERT G. SHERIDAN, *Primary Examiner.*